(12) United States Patent
Ma

(10) Patent No.: US 11,428,907 B2
(45) Date of Patent: Aug. 30, 2022

(54) OPTICAL LENS MODULE

(71) Applicant: AAC Optics Solutions Pte. Ltd., Singapore (SG)

(72) Inventor: Jie Ma, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 159 days.

(21) Appl. No.: 16/914,373

(22) Filed: Jun. 28, 2020

(65) Prior Publication Data

US 2020/0409110 A1    Dec. 31, 2020

(30) Foreign Application Priority Data

Jun. 28, 2019   (WO) ................ PCT/CN2019/093908

(51) Int. Cl.
*G02B 7/02* (2021.01)
*H04N 5/225* (2006.01)
*G02B 13/00* (2006.01)
*G02B 1/04* (2006.01)

(52) U.S. Cl.
CPC ........... *G02B 13/0045* (2013.01); *G02B 1/04* (2013.01); *G02B 7/021* (2013.01); *G02B 7/026* (2013.01); *H04N 5/2254* (2013.01)

(58) Field of Classification Search
CPC .......... G02B 7/02; G02B 7/021; G02B 7/022; G02B 7/023; G02B 7/025; G02B 7/026; G02B 7/027; G02B 13/0045; G02B 7/003; G02B 3/0075; G02B 3/0062; H04N 5/2254

See application file for complete search history.

(56) References Cited

U.S. PATENT DOCUMENTS

2020/0026022 A1*  1/2020  Lin ................. G02B 7/022
2020/0310225 A1* 10/2020  Shirotori ............ G02B 7/025

FOREIGN PATENT DOCUMENTS

| CN | 109358402 A | * | 2/2019 | ............ G02B 7/021 |
| JP | 2007057795 A | * | 3/2007 | |
| JP | 2008070484 A | * | 3/2008 | |

\* cited by examiner

*Primary Examiner* — Ephrem Z Mebrahtu
(74) *Attorney, Agent, or Firm* — W&G Law Group

(57) ABSTRACT

Provided is an optical lens module including a lens barrel, a lens assembly and a press ring, the lens barrel has an object side end surface, the lens assembly includes a first lens and a second lens, the first lens is a plastic lens including an imaging portion and a fixing portion around the imaging portion, the imaging portion extends towards and beyond an object side, the second lens is located in the lens barrel. The press ring includes an inner side surface and an outer side surface, the inner side surface is fixed with the fixing portion, the outer side surface is connected with the lens barrel, the press ring abuts against an object side surface of the second lens. In this optical lens module, head size of the optical lens module is no longer limited by wall thickness of the lens barrel, thereby greatly reducing head size.

9 Claims, 4 Drawing Sheets

OPTICAL LENS MODULE

TECHNICAL FIELD

The present invention relates to the field of optical imaging technology and, in particular, to an optical lens.

BACKGROUND

Nowadays, an optical lens module has been widely used in various electronic products, such as mobile phones and tablets. With development of camera technology and increasing demand for the electronic products, the optical lens module is becoming more and more miniaturized.

In spite of this, many optical lens modules are still limited by the size of the lens and the wall thickness of the lens barrel, which cannot meet design requirements for miniaturization of the head portion of the optical lens module.

Therefore, it is necessary to provide an optical lens module to solve the above technical problems.

SUMMARY

An object of the present invention is to provide an optical lens module, which aims to solve the problem of a relatively large size of the head of the conventional optical lens module.

The technical solution of the present invention is as follows:

An optical lens module, including:

a lens barrel comprising an object side end surface;

a lens assembly comprising a first lens and a second lens disposed on an image side of the first lens, the first lens being a plastic lens and comprising an imaging portion and a fixing portion surrounding the imaging portion, the imaging portion extending towards an object side and protruding from the object side end surface, and the second lens being located in the lens barrel; and a press ring comprising an outer side surface and an inner side surface arranged opposite to the outer side surface, the outer side surface being connected to the lens barrel, the inner side surface being fixed to the fixing portion, and the press ring abutting against an object side surface of the second lens.

In an embodiment, a adhesive receiving groove is provided between the inner side surface and the fixing portion, and the inner side surface is adhered and fixed to the fixing portion.

In an embodiment, the imaging portion comprises a first curved surface and a second curved surface that is bent and extends from the first curved surface, and in a direction from an object side to an image side, a generatrix of the second curved surface is inclined in a direction facing away from an optical axis of the optical lens module.

In an embodiment, an image side surface of the fixing portion comprises a first horizontal surface and a first inclined surface obliquely extending from the first horizontal surface towards the image side, an object side surface of the second lens comprises a second horizontal surface and a second inclined surface obliquely extending from the second horizontal surface towards the image side, the first horizontal surface abuts against the second horizontal surface, and the first inclined surface abuts against the second inclined surface.

In an embodiment, the outer side surface is adhered and fixed to the lens barrel.

In an embodiment, the lens assembly further comprises a third lens and a first light-shielding sheet, the third lens is provided on an image side of the second lens, an outer diameter of the third lens is smaller than an outer diameter of the second lens, and the first light-shielding sheet is disposed between the second lens and the third lens.

In an embodiment, an image side surface of the second lens comprises a third horizontal surface, a third inclined surface connected to the third horizontal surface and a first bearing surface connected to the third inclined surface, the third inclined surface extends obliquely from the third horizontal surface towards the image side, an object side surface of the third lens comprises a fourth horizontal surface, a fourth inclined surface connected to the fourth horizontal surface and a second bearing surface connected to the fourth inclined surface, the fourth inclined surface extends obliquely from the fourth horizontal surface towards the image side, the third horizontal surface abuts against the fourth horizontal surface, the third inclined surface abuts against the fourth inclined surface, and the first light-shielding sheet is sandwiched between the first bearing surface and the second bearing surface.

In an embodiment, the lens assembly further comprises a fourth lens and a fifth lens, and the third lens, the fourth lens and the fifth lens are sequentially arranged in the direction from the object side to the image side, and outer diameters of the third lens, the fourth lens and the fifth lens gradually decrease.

In an embodiment, the lens barrel further comprises a bearing portion extending from an end close to the image side towards an optical axis of the optical lens module, and a lens in the lens assembly closest to the image side rests on the bearing portion.

In an embodiment, the second lens is a plastic lens.

The beneficial effects of the present invention lie in:

In the above optical lens module, the imaging portion of the first lens extends towards the object side and protrudes from the object side end surface of the lens barrel. In other words, a partial structure of the first lens is located outside the lens barrel. Therefore, a size of the partial structure of the first lens located outside the lens barrel determines a head size of the entire optical lens module, and the head size of the optical lens module is no longer limited by a wall thickness of the lens barrel, thereby greatly reducing the head size.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will be further illustrated with reference to the accompanying drawings and the embodiments.

Figure 1:
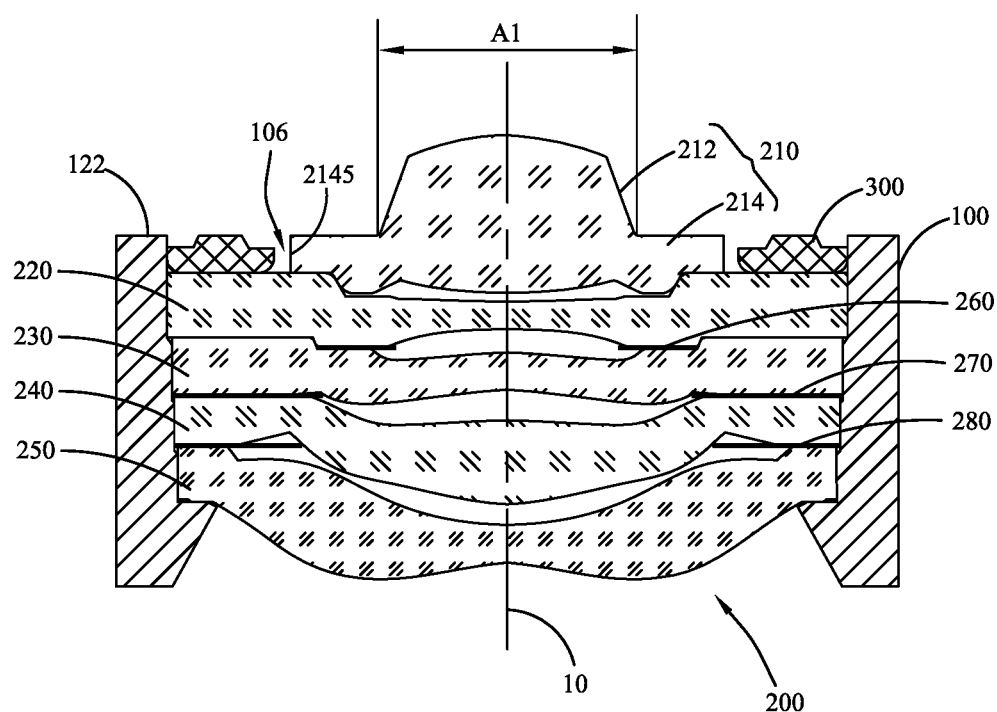
FIG. 1 is a structural schematic diagram of an optical lens module according to an embodiment of the present invention.
Figure 2:
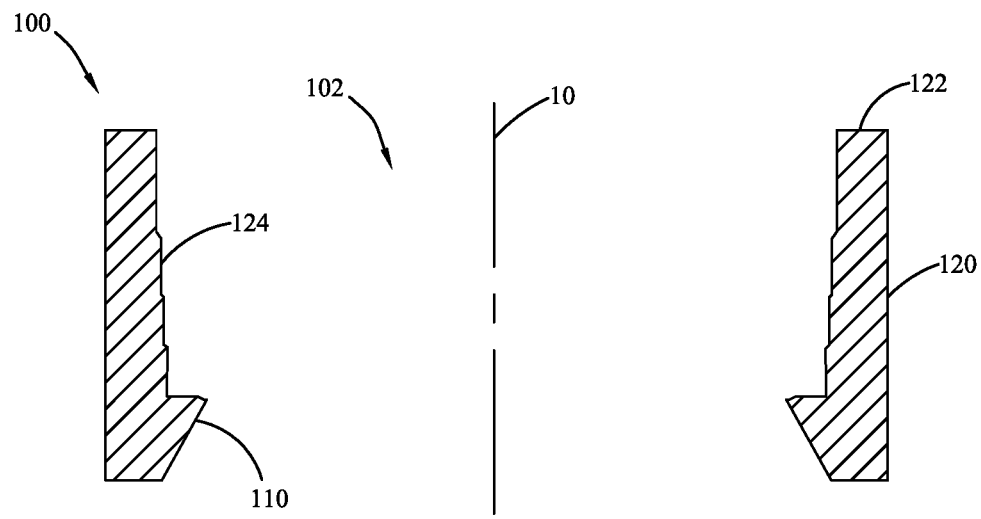
FIG. 2 is a structural schematic diagram of a lens barrel in the optical lens module shown in FIG. 1.

As shown in FIGS. 1 and 2, an optical lens module according to an embodiment can be applied to electronic products such as mobile phones and tablets, and the optical lens module includes a lens barrel 100 and a lens assembly 200. The lens barrel 100, as a main mounting structure of the lens assembly 200, may be a circular barrel or a square barrel.

The lens barrel 100 includes a bearing portion 110 and a sidewall 120. An end of the sidewall 120 close to an object side is open and has an object side end surface 122, and the object side end surface 122 is a plane perpendicular to an optical axis 10 of the optical lens module. The bearing portion 110 is provided at an end of the sidewall 120 close to an image side and extends from the sidewall 120 along a direction of the optical axis 10. The bearing portion 110 is connected to the sidewall 120 to form a receiving cavity 102. A surface of the sidewall 120 close to the receiving cavity 102 is a multi-stage stepped surface 124, and an inner diameter of the stepped surface 124 gradually increases along a direction from the object side to the image side.

The lens assembly 200 includes a plurality of lenses sequentially arranged along the direction from the object side to the image side, the plurality of lenses are respectively a first lens 210, a second lens 220, a third lens 230, a fourth lens 240, and a fifth lens 250. In other words, in the present embodiment, the lens assembly 200 includes 5 lenses in total. An outer diameter of the first lens 210 is smaller than an outer diameter of the second lens 220. The outer diameter of the second lens 220, an outer diameter of the third lens 230, an outer diameter of the fourth lens 240, and an outer diameter of the fifth lens 250 gradually decrease. Therefore, it is not difficult to understand that, among the plurality of lenses, the first lens 210 is closest to the object side, the fifth lens 250 is closest to the image side, and the second lens 220 has the largest outer diameter.

Moreover, the second lens 220, the third lens 230, the fourth lens 240 and the fifth lens 250 are all disposed in the receiving cavity 102, and an image side surface of the fifth lens 250 rests on the bearing portion 110. The outer diameters of the lenses are adapted to the inner diameter of the corresponding stepped surface 124, so that these lenses can be prevented from shifting in a direction perpendicular to the optical axis 10.

Figure 7:
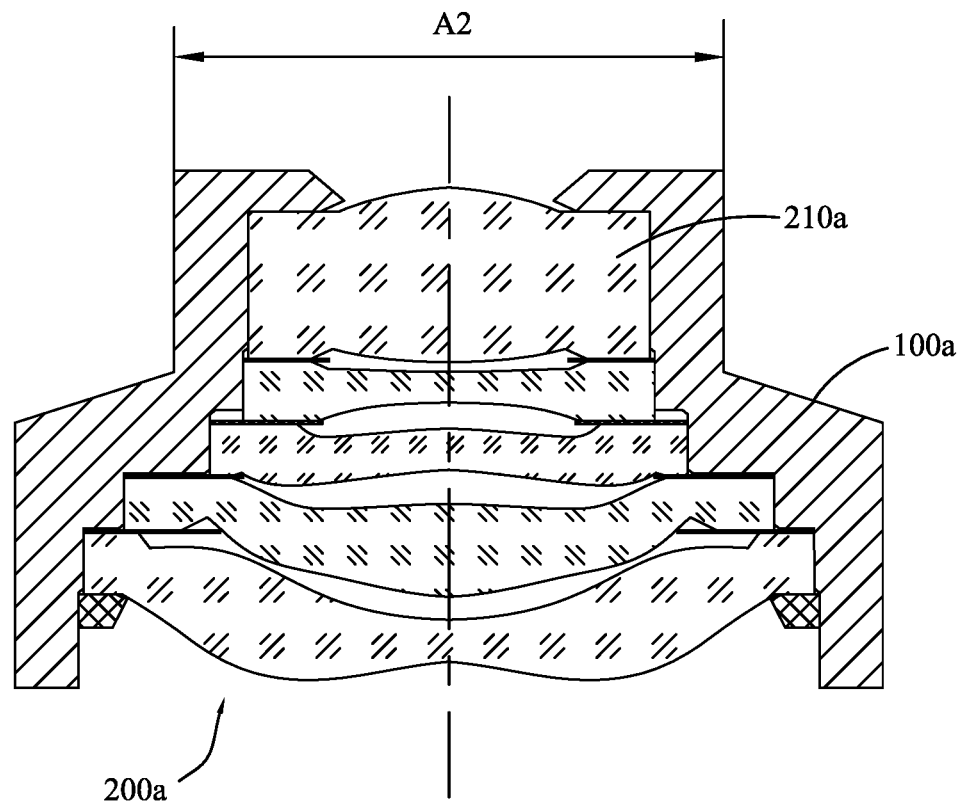
FIG. 7 is a structural schematic diagram of a conventional optical lens module.

Referring to FIG. 1, the first lens 210 includes an imaging portion 212 and a fixing portion 214 surrounding the imaging portion 212, the imaging portion 212 extends along a direction towards the object side and extends beyond the object side end surface 122. In other words, a partial structure of the first lens 210 is located outside the lens barrel 100. Therefore, a size A1 of the partial structure of the first lens 210 located outside the lens barrel 100 determines a head size of the entire optical lens module, and the head size of the optical lens module is no longer limited by a wall thickness of the lens barrel 100, such that the head size can be greatly reduced. However, in a conventional optical lens module shown in FIG. 7, a lens assembly 200a is completely received in a lens barrel 100a, a head size A2 of an optical lens module is equal to a sum of a size of a first lens 210a and a wall thickness of the lens barrel 100a. Moreover, for the first lens 210a of different models, the lens barrel 100a also needs to be adaptively resized to fit the first lens 210a, which will also increase production cost of the conventional optical lens module.

Figure 3:
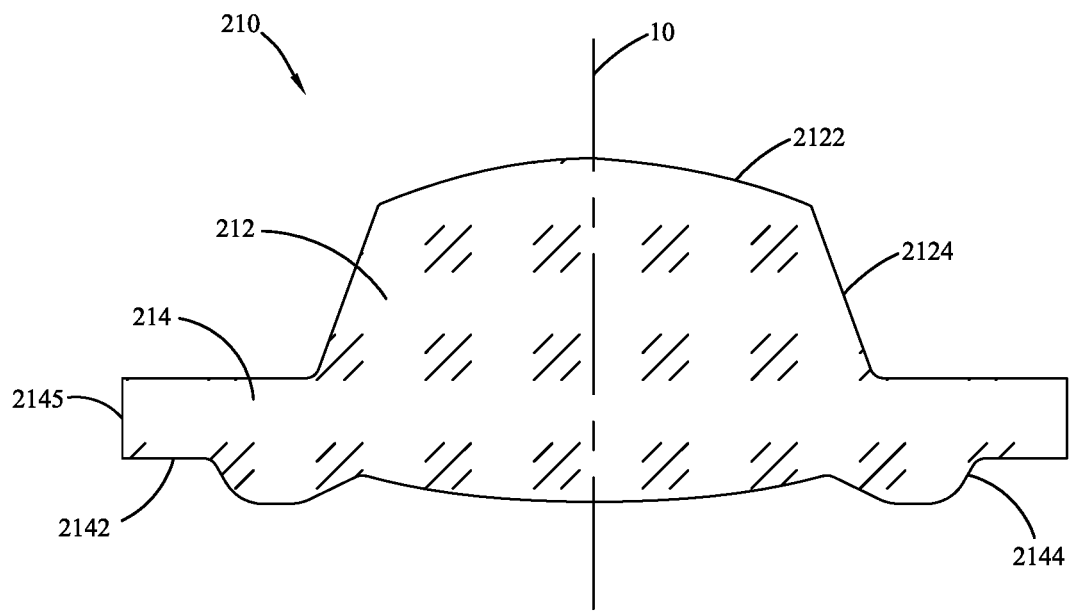
FIG. 3 is a structural schematic diagram of a first lens in the optical lens module shown in FIG. 1.

As shown in FIG. 3, in an embodiment, the imaging unit 212 includes a first curved surface 2122 and a second curved surface 2124 bent from the first curved surface 2122. In the direction from the object side to the image side, a generatrix of the second curved surface 2124 is inclined towards a direction facing away from the optical axis 10. In other words, that is, in the direction from the object side to the image side, a distance between the second curved surface 2124 and the optical axis 10 gradually increases. Since the first lens 210 is a plastic lens and is manufactured by an injection molding process, such design of the second curved surface 2124 can facilitate demoulding of the first lens 210.

In addition, in the present embodiment, the second lens 220, the third lens 230, the fourth lens 240, and the fifth lens 250 are also plastic lenses.

Figure 4:
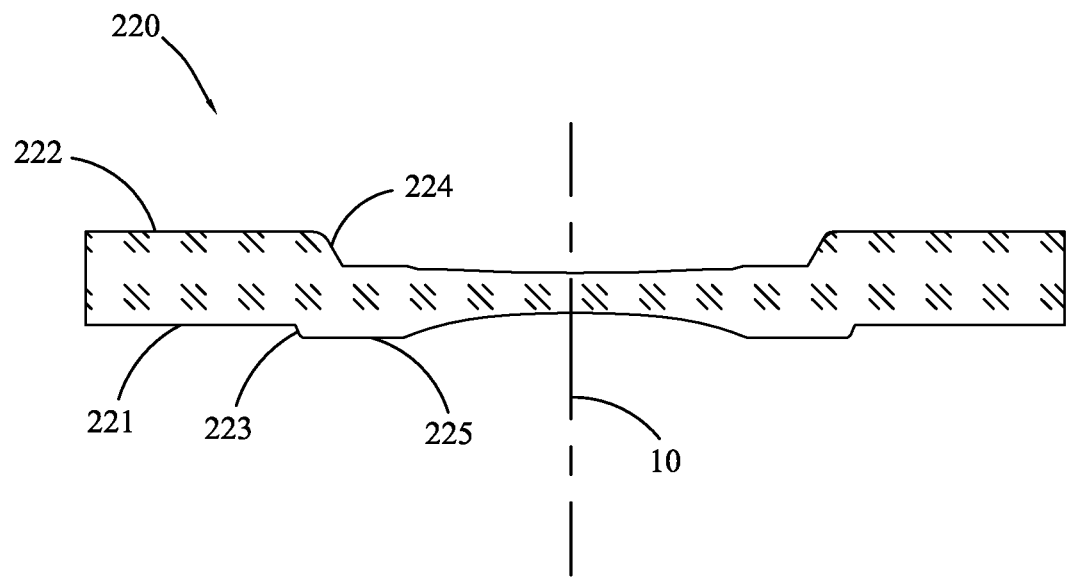
FIG. 4 is a structural schematic diagram of a second lens in the optical lens module shown in FIG. 1.

In an embodiment, the first lens 210 and the second lens 220 are fitted by bumpy ridges. Specifically, referring to FIGS. 3-4, an image side surface of the fixing portion 214 includes a first horizontal surface 2142 and a first inclined surface 2144 extending obliquely from the first horizontal surface 2142 in a direction towards the image side, and the first inclined surface 2144 is inclined towards a direction close to the optical axis 10. An object side surface of the second lens 220 includes a second horizontal surface 222 and a second inclined surface 224 extending obliquely from the second horizontal surface 222 in the direction towards the image side, and the second inclined surface is inclined towards the direction close to the optical axis 10. The first horizontal surface 2142 abuts against the second horizontal surface 222, and the first inclined surface 2144 abuts against the second inclined surface 224.

Figure 5:
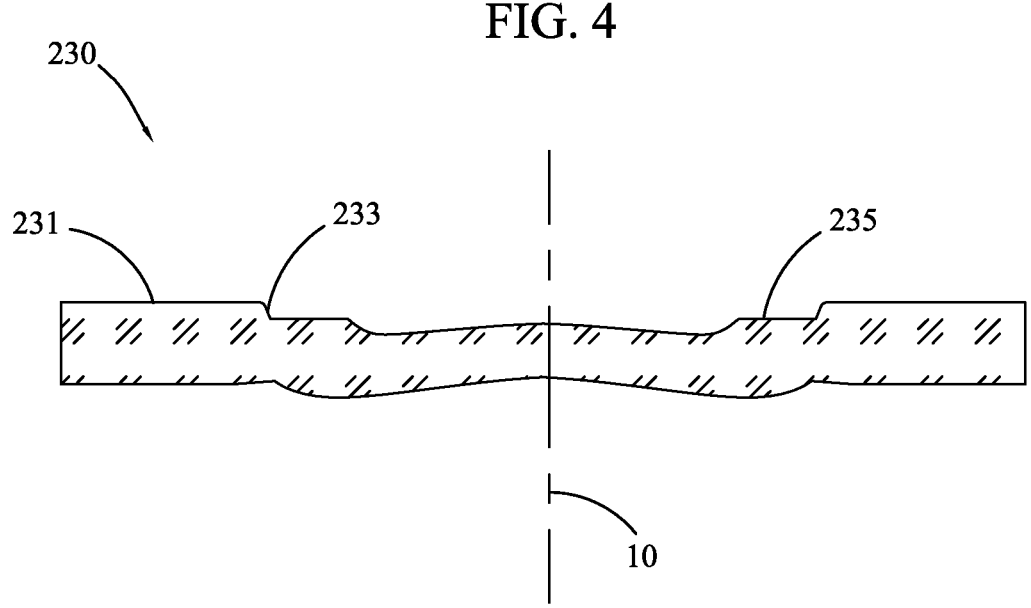
FIG. 5 is a structural schematic diagram of a third lens in the optical lens module shown in FIG. 1.

Further, the second lens 220 and the third lens 230 are also fitted by bumpy ridges. Specifically, referring to FIGS. 4-5, an image side surface of the second lens 220 includes a third horizontal surface 221, a third inclined surface 223 and a first bearing surface 225 that are connected in sequence. The third inclined surface 223 extends obliquely from the third horizontal surface 221 in the direction towards the image side, the third inclined surface 223 is inclined towards the direction close to the optical axis 10, and the first bearing surface 225 is parallel to the third horizontal surface 221. An object side surface of the third lens 230 includes a fourth horizontal surface 231, a fourth inclined surface 233 and a second bearing surface 235 that are connected in sequence. The fourth inclined surface 233 extends obliquely from the fourth horizontal surface 231 in the direction towards the image side, the fourth inclined surface 233 is inclined towards the direction close to the optical axis 10, and the second bearing surface 235 is parallel to the fourth horizontal surface 231. The third horizontal surface 221 abuts against the fourth horizontal surface 231, the third inclined surface 223 abuts against the fourth inclined surface 233, and the first bearing surface 225 is arranged opposite to the second bearing surface 235.

In an present embodiment, referring to FIG. 1, the lens assembly 200 further includes a first light-shielding sheet 260, a second light-shielding sheet 270 and a third light-shielding sheet 280, and the first light-shielding sheet 260 is disposed between the second lens 220 and the third lens 230. More specifically, the first light-shielding sheet 260 is sandwiched between the first bearing surface 225 and the second bearing surface 235. The second light-shielding sheet 270 is disposed between the third lens 230 and the fourth lens 240, and the third light-shielding sheet 280 is disposed between the fourth lens 240 and the fifth lens 250. These light-shielding sheets all have the function of blocking stray light, so as to avoid the stray light from entering an imaging area and affecting the imaging quality.

In the present embodiment, the first light-shielding sheet 260, the second light-shielding sheet 270, and the third light-shielding sheet 280 are all made of a black plastic material by injection molding, in order to improve dimensional accuracy, such that an effect of blocking the stray light will not be reduced or effective imaging light will not be blocked too much to affect the imaging quality due to manufacturing errors. In other embodiments, these light-shielding sheets can also be made of a black thin-film by stamping.

Figure 6:
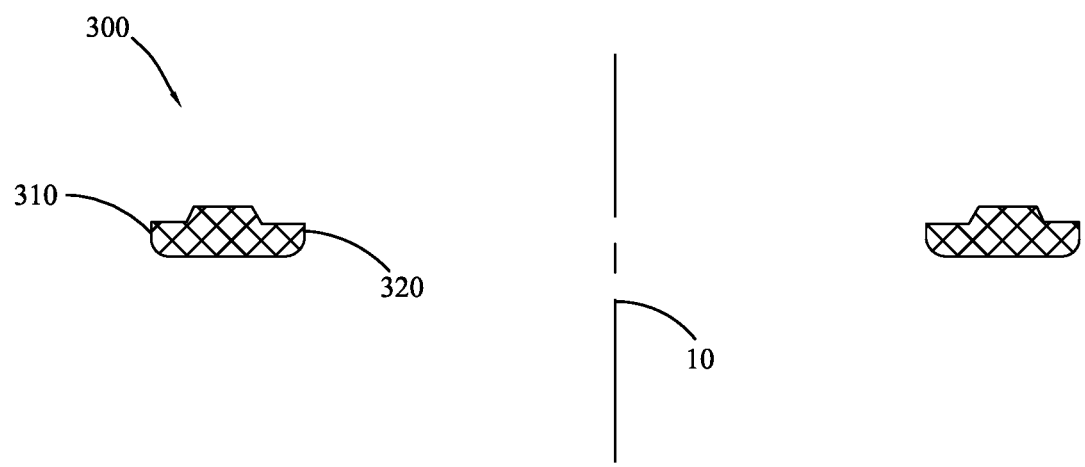
FIG. 6 is a structural schematic diagram of a press ring in the optical lens module shown in FIG. 1.

As shown in FIGS. 1 and 6, the optical lens module further includes a press ring 300 disposed in the receiving cavity 102, and the press ring 300 includes an outer side surface 310 and an inner side surface 320 that are oppositely arranged in a direction perpendicular to the optical axis. The outer side surface 310 is connected to a surface of the sidewall 120 close to the receiving cavity 102 so as to realize connection between the press ring 300 and the lens barrel 100, and the inner side surface 320 is connected to the fixing portion 214 to realize connection between the press ring 300 and the first lens 210, so that the press ring 300 achieves the purpose of fixing the first lens 210 on the lens barrel 100. In addition, the press ring 300 also abuts against the object side surface of the second lens 220, and specifically, in the present embodiment, the side of the press ring 300 close to an image side abuts against the second horizontal surface 222, so that the press ring 300 can also fit to the bearing portion 110 to achieve the purpose of fixing the second lens 220, the third lens 230, the fourth lens 240 and the fifth lens 250 on the lens barrel 100.

In an embodiment, the outer side surface 310 and the lens barrel 100 are glued and fixed by glue dispensing, Specifically, the fixing portion 214 has a side surface 2145 arranged opposite to the inner side surface 320 in a direction perpendicular to the optical axis, an adhesive receiving groove 106 is provided between the inner side surface 320 and the side surface 2145, and the glue connection and fixing of the two are achieved by dispensing glue in the adhesive receiving groove 106. It can be understood that, in other embodiments, the press ring 300 may also be connected to the sidewall 120 by thread connection, which is not limited herein.

When assembling the optical lens module of the present invention, the fifth lens 250, the fourth lens 240, the third lens 230, the second lens 220, and the first lens 210 are assembled in sequence on the lens barrel 100 along the direction from the image side to the object side, and finally the fixing of the lens assembly 200 is achieved by the press ring 300.

In addition, it should be noted that the number of the lenses included in the lens assembly 200 is not limited to the embodiment shown in FIG. 1, and the number of the lenses may be 2, 3, 4, 6 or more.

It should be noted that, the above are merely embodiments of the present invention, those skilled in the art can make improvements without departing from the inventive concept of the present invention, however, these improvements shall belong to the protection scope of the present invention.

What is claimed is:

1. An optical lens module, the optical lens module has an optical axis, comprising:

a lens barrel comprising an object side end surface;

a lens assembly comprising a first lens and a second lens disposed on an image side of the first lens, the first lens being a plastic lens and comprising an imaging portion and a fixing portion surrounding the imaging portion, the imaging portion extending towards an object side and protruding from the object side end surface, and the second lens being located in the lens barrel; and a press ring comprising an outer side surface and an inner side surface arranged opposite to the outer side surface in a direction perpendicular to the optical axis, the outer side surface being connected to the lens barrel, the fixing portion has a side surface arranged opposite to the inner side surface in a direction perpendicular to the optical axis, the inner side surface and the side surface are spaced to form an adhesive receiving groove, the inner side surface and the side surface are fixed by dispensing glue in the adhesive receiving groove, and the side of the press ring close to an image side abutting against an object side surface of the second lens.

2. The optical lens module as described in claim 1, wherein the imaging portion comprises a first curved surface and a second curved surface that is bent and extends from the first curved surface, and in a direction from an object side to an image side, a generatrix of the second curved surface is inclined in a direction facing away from an optical axis of the optical lens module.

3. The optical lens module as described in claim 1, wherein an image side surface of the fixing portion comprises a first horizontal surface and a first inclined surface obliquely extending from the first horizontal surface towards the image side, an object side surface of the second lens comprises a second horizontal surface and a second inclined surface obliquely extending from the second horizontal surface towards the image side, the first horizontal surface abuts against the second horizontal surface, and the first inclined surface abuts against the second inclined surface.

4. The optical lens module as described in claim 1, wherein the outer side surface is adhered and fixed to the lens barrel.

5. The optical lens module as described in claim 1, wherein the lens assembly further comprises a third lens and a first light-shielding sheet, the third lens is provided on an image side of the second lens, an outer diameter of the third lens is smaller than an outer diameter of the second lens, and the first light-shielding sheet is disposed between the second lens and the third lens.

6. The optical lens module as described in claim 5, wherein an image side surface of the second lens comprises a third horizontal surface, a third inclined surface connected to the third horizontal surface and a first bearing surface connected to the third inclined surface, the third inclined surface extends obliquely from the third horizontal surface towards the image side, an object side surface of the third lens comprises a fourth horizontal surface, a fourth inclined surface connected to the fourth horizontal surface and a second bearing surface connected to the fourth inclined surface, the fourth inclined surface extends obliquely from the fourth horizontal surface towards the image side, the third horizontal surface abuts against the fourth horizontal surface, the third inclined surface abuts against the fourth inclined surface, and the first light-shielding sheet is sandwiched between the first bearing surface and the second bearing surface.

7. The optical lens module as described in claim 5, wherein the lens assembly further comprises a fourth lens and a fifth lens, and the third lens, the fourth lens and the fifth lens are sequentially arranged in the direction from the object side to the image side, and outer diameters of the third lens, the fourth lens and the fifth lens gradually decrease.

8. The optical lens module as described in claim 1, wherein the lens barrel further comprises a bearing portion extending from an end close to the image side towards an optical axis of the optical lens module, and a lens in the lens assembly closest to the image side rests on the bearing portion.

9. The optical lens module as described in claim 1, wherein the second lens is a plastic lens.

* * * * *